US007831519B2

(12) United States Patent
Kean

(10) Patent No.: US 7,831,519 B2
(45) Date of Patent: Nov. 9, 2010

(54) METHODS AND SYSTEMS FOR ELECTROMAGNETIC INITIATION OF SECURE TRANSACTIONS

(75) Inventor: Brian T. Kean, Missouri Valley, IA (US)

(73) Assignee: First Data Corporation, Greenwood Village, CO (US)

( * ) Notice: Subject to any disclaimer, the term of this patent is extended or adjusted under 35 U.S.C. 154(b) by 268 days.

(21) Appl. No.: 10/997,770

(22) Filed: Nov. 23, 2004

(65) Prior Publication Data
US 2005/0137986 A1 Jun. 23, 2005

Related U.S. Application Data

(60) Provisional application No. 60/530,510, filed on Dec. 17, 2003.

(51) Int. Cl.
*G06Q 20/00* (2006.01)
*G06Q 30/00* (2006.01)
(52) U.S. Cl. ............... 705/64; 340/7.5; 705/14.38
(58) Field of Classification Search ............ 705/64, 705/67; 714/4
See application file for complete search history.

(56) References Cited

U.S. PATENT DOCUMENTS

| 3,599,151 A | 8/1971 | Harr |
| 3,833,395 A | 9/1974 | Gosnell |
| 4,321,672 A | 3/1982 | Braun et al. |
| 4,562,340 A | 12/1985 | Tateisi et al. |
| 4,562,341 A | 12/1985 | Ohmae et al. |
| 4,630,200 A | 12/1986 | Ohmae et al. |
| 4,678,895 A | 7/1987 | Tateisi et al. |
| 4,722,554 A | 2/1988 | Pettit |
| 4,812,628 A | 3/1989 | Boston et al. |
| 4,902,881 A | 2/1990 | Janku |
| 4,961,142 A | 10/1990 | Elliott et al. |
| 5,029,208 A | 7/1991 | Tanaka |
| 5,053,607 A | 10/1991 | Carlson et al. |

(Continued)

FOREIGN PATENT DOCUMENTS

CA         2271178         7/1999

(Continued)

OTHER PUBLICATIONS

Applied Cryptography, 2nd Edition, Bruce Schneier, p. 480-481.*

(Continued)

*Primary Examiner*—Evens J Augustin
(74) *Attorney, Agent, or Firm*—Townsend and Townsend and Crew, LLP

(57) ABSTRACT

Methods and systems are provided for processing secure transactions. An electromagnetic transmission packet is received from a portable device at a processing device. The electromagnetic transmission packet includes an encrypted magnetic-stripe image and an encrypted version of an alphanumerical identifier. A keyed nonencrypted version of the alphanumerical identifier is received at the processing device, and the encrypted version of the alphanumerical identifier is decrypted. The decryption of the encrypted version of the alphanumerical identifier is compared with the nonencrypted version of the alphanumerical identifier. Thereafter, a decryption of the encrypted magnetic-stripe image is transmitted to a host system for processing the secure transaction using an account identified by the decryption of the magnetic-stripe image.

28 Claims, 7 Drawing Sheets

U.S. PATENT DOCUMENTS

| | | |
|---|---|---|
| 5,119,293 A | 6/1992 | Hammond |
| 5,175,682 A | 12/1992 | Higashiyama et al. |
| 5,220,501 A | 6/1993 | Lawlor et al. |
| 5,233,167 A | 8/1993 | Markman et al. |
| 5,367,452 A | 11/1994 | Gallery et al. |
| 5,408,077 A | 4/1995 | Campo et al. |
| 5,426,594 A | 6/1995 | Wright et al. |
| 5,464,971 A | 11/1995 | Sutcliffe et al. |
| 5,484,988 A | 1/1996 | Hills et al. |
| 5,491,325 A | 2/1996 | Huang et al. |
| 5,502,766 A | 3/1996 | Boebert et al. |
| 5,504,677 A | 4/1996 | Pollin |
| 5,510,979 A | 4/1996 | Moderi et al. |
| 5,555,496 A | 9/1996 | Tackbary et al. |
| 5,577,109 A | 11/1996 | Stimson et al. |
| 5,586,036 A | 12/1996 | Pintsov |
| 5,622,388 A | 4/1997 | Alcordo |
| 5,640,002 A | 6/1997 | Ruppert et al. |
| 5,650,604 A | 7/1997 | Marcous et al. |
| 5,657,201 A | 8/1997 | Kochis |
| 5,677,955 A | 10/1997 | Doggett et al. |
| 5,679,940 A | 10/1997 | Templeton et al. |
| 5,699,528 A | 12/1997 | Hogan |
| 5,757,917 A | 5/1998 | Rose et al. |
| 5,790,677 A | 8/1998 | Fox et al. |
| 5,794,207 A | 8/1998 | Walker et al. |
| 5,815,657 A | 9/1998 | Williams et al. |
| 5,825,617 A | 10/1998 | Kochis et al. |
| 5,826,241 A | 10/1998 | Stein et al. |
| 5,828,875 A | 10/1998 | Halvarsson et al. |
| 5,832,463 A | 11/1998 | Funk |
| 5,878,211 A | 3/1999 | Delagrange et al. |
| 5,893,080 A | 4/1999 | McGurl et al. |
| 5,910,988 A | 6/1999 | Ballard |
| 5,949,044 A | 9/1999 | Walker et al. |
| 5,960,412 A | 9/1999 | Tackbary et al. |
| 5,987,426 A | 11/1999 | Goodwil, III |
| 6,000,522 A | 12/1999 | Johnson |
| 6,000,832 A | 12/1999 | Franklin et al. |
| 6,021,202 A | 2/2000 | Anderson et al. |
| 6,029,150 A | 2/2000 | Kravitz |
| 6,030,000 A | 2/2000 | Diamond |
| 6,032,133 A | 2/2000 | Hilts et al. |
| 6,032,137 A | 2/2000 | Ballard |
| 6,039,245 A | 3/2000 | Symonds et al. |
| 6,058,417 A | 5/2000 | Hess et al. |
| 6,061,794 A | 5/2000 | Angelo et al. |
| 6,061,799 A | 5/2000 | Eldridge et al. |
| 6,064,990 A | 5/2000 | Goldsmith |
| 6,070,154 A | 5/2000 | Tavor et al. |
| 6,070,798 A | 6/2000 | Nethery |
| 6,097,834 A | 8/2000 | Krouse et al. |
| 6,102,287 A | 8/2000 | Matyas, Jr. |
| 6,104,815 A | 8/2000 | Alcorn et al. |
| 6,106,020 A | 8/2000 | Leef et al. |
| 6,119,106 A | 9/2000 | Mersky et al. |
| 6,122,625 A | 9/2000 | Rosen |
| 6,149,056 A | 11/2000 | Stindon et al. |
| 6,164,528 A | 12/2000 | Hills et al. |
| 6,175,823 B1 | 1/2001 | Van Dusen |
| 6,193,152 B1 | 2/2001 | Fernando et al. |
| 6,199,761 B1 | 3/2001 | Drexler |
| 6,213,391 B1 | 4/2001 | Lewis |
| 6,246,996 B1 | 6/2001 | Stein et al. |
| 6,253,027 B1 | 6/2001 | Weber et al. |
| 6,282,522 B1 | 8/2001 | Davis et al. |
| 6,305,604 B1 | 10/2001 | Ono |
| 6,308,887 B1 | 10/2001 | Korman et al. |
| 6,314,519 B1 | 11/2001 | Davis et al. |
| 6,321,984 B1 | 11/2001 | McCall et al. |
| 6,324,525 B1 | 11/2001 | Kramer et al. |
| 6,327,570 B1 | 12/2001 | Stevens |
| 6,327,575 B1 | 12/2001 | Katz |
| 6,360,254 B1 | 3/2002 | Linden et al. |
| 6,367,693 B1 | 4/2002 | Novogrod |
| 6,470,448 B1 | 10/2002 | Kuroda et al. |
| 6,484,936 B1 | 11/2002 | Nicoll et al. |
| 6,510,516 B1 | 1/2003 | Benson et al. |
| 6,523,067 B2 | 2/2003 | Mi et al. |
| 6,532,451 B1 | 3/2003 | Schell et al. |
| 6,539,363 B1 | 3/2003 | Allgeier et al. |
| 6,547,132 B1 | 4/2003 | Templeton et al. |
| 6,549,119 B1 | 4/2003 | Turner |
| 6,565,000 B2 | 5/2003 | Sehr |
| 6,571,339 B1 | 5/2003 | Danneels et al. |
| 6,827,260 B2 | 12/2004 | Stoutenburg et al. |
| 6,840,455 B2 | 1/2005 | Norton |
| 6,886,742 B2 | 5/2005 | Stoutenburg et al. |
| 7,117,374 B2 | 10/2006 | Hill et al. |
| 7,127,236 B2 * | 10/2006 | Khan et al. ............... 455/414.1 |
| 7,376,583 B1 * | 5/2008 | Rolf ............................ 705/17 |
| 7,395,050 B2 * | 7/2008 | Tuomi et al. ................. 455/411 |
| 2001/0051876 A1 | 12/2001 | Seigel et al. |
| 2002/0042753 A1 * | 4/2002 | Ortiz et al. ..................... 705/26 |
| 2002/0065680 A1 | 5/2002 | Kojima et al. |
| 2002/0091577 A1 | 7/2002 | Parry et al. |
| 2002/0120846 A1 | 8/2002 | Stewart et al. |
| 2002/0124031 A1 | 9/2002 | Chang |
| 2002/0156683 A1 | 10/2002 | Stoutenburg et al. |
| 2002/0166891 A1 | 11/2002 | Stoutenburg et al. |
| 2002/0194137 A1 | 12/2002 | Park et al. |
| 2003/0004891 A1 | 1/2003 | Van Rensburg et al. |
| 2003/0014372 A1 * | 1/2003 | Wheeler et al. ................ 705/71 |
| 2003/0055792 A1 * | 3/2003 | Kinoshita et al. ............. 705/67 |
| 2003/0121969 A1 | 7/2003 | Wankmueller |
| 2004/0029569 A1 * | 2/2004 | Khan et al. ............... 455/414.1 |
| 2004/0088567 A1 * | 5/2004 | Lamotte ..................... 713/200 |
| 2004/0098350 A1 * | 5/2004 | Labrou et al. ................. 705/64 |
| 2004/0122685 A1 | 6/2004 | Bunce |
| 2004/0125077 A1 | 7/2004 | Ashton |
| 2004/0135671 A1 * | 7/2004 | Khoshbin et al. .......... 340/7.53 |
| 2004/0153649 A1 | 8/2004 | Rhoads et al. |
| 2005/0005190 A1 * | 1/2005 | Ofir et al. ....................... 714/4 |
| 2005/0015618 A1 * | 1/2005 | Schneider et al. ........... 713/201 |

FOREIGN PATENT DOCUMENTS

| | | |
|---|---|---|
| EP | 481135 A1 | 4/1992 |
| EP | 949596 A2 | 10/1999 |
| EP | 1077436 A2 | 2/2001 |
| WO | WO 00/46725 A1 | 8/2000 |
| WO | WO 00/67177 A2 | 11/2000 |
| WO | WO 01/04816 A1 | 1/2001 |
| WO | WO 02/05195 A1 | 1/2002 |

OTHER PUBLICATIONS

Menezes et al., "Applied Handbook of Cryptography," 1997, Section 1.4-1.23 Basic Terminology and Concepts.

Digital Signature Guidelines Tutorial; ABA Network, (web site at http://www.abanet.org/scietech/ec/isc/dsg-tutorial.html). date of capture Feb. 18, 2003, pp. 1-7.

Gerck, Ed, Overview of Certification Systems: x.509, PKIX, CA, PGP & SKIP—Do you understand digital certificates? Do you know what they warrant? Jul. 18, 2000; pp. 1-18.

Linn, John, Trust Models and Management in Public-Key Infrastructures; RSA Laboratories, Nov. 6, 2000, pp. 1-13.

PKCS #5, v2.0: Password-Based Cryptography Standard, RSA Laboratories, Redwood City, CA; Mar. 25, 1999; pp. 1-30.

PKCS #9, v2.0: Selected Object Classes and Attribute Types, RSA Laboratories, Redwood City, CA; Feb. 25, 2000; pp. 1-34.

PKCS #10, v1.7: Certificate Request Syntax Standard, RSA Laboratories, Redwood City, CA; May 26, 2000; pp. I-10.

PCKS #12, v1.0: Personal Information Exchange Syntax, RSA Laboratories, Redwood City, CA; Jun. 24, 1999; pp. 1-23.

PCKS #15: Conformance Profile Specification; RSA Laboratories, Redwood City, CA; Aug. 1, 2000; pp. 1-8.
Pepe, Michel; Smart Cards Gaining Traction; CRN.com—Point of Sale: Trends, Markets and Technologies; Dec. 31, 2002, (web site at http://cm.channelsupersearch.com/news/cm/39163.asp) captured on Feb. 18, 2003; pp. 1-2.
Guide to Internet Security; Public Key Cryptography (web site at http://www.e-certify.com/library/pkc_guide.htm) captured on Feb. 18, 2003.
Private Server Product Description; (web site at http://www.bnn.com.tr/assets/cserver_prodesc.html). date of capture Feb. 18, 2003; pp. 1-11.
Cylink atm encryptor (web site at http//securitytools.hypermart.net/security_1/cylink_atm_encryptor.html), date of capture Feb. 18, 2003, p. 1.
Bal"s PGP Pubic Key Server; The Computer Law Resource 1996; (web site at http://www.complaw.com/pgp/webkeyserver.html) date of capture Feb. 18, 2003; pp. 1-2.
Baltimore; Solutions; A New Era in Secure and Trusted E-Business; (web site at http://www.baltimore.com/solutions/index.asp) date of capture Feb. 18, 2003; p. 1.
(PGP) Pretty Good Privacy; What's? com; Dec. 27,2000; (web site at http://whatis.techtarget.com/WhatIs_Definition_Page/0.4152.214292.00.html) date of capture Dec. 27, 2000; pp. 1-3.
An Introduction to Cryptography; Network Associates, Inc. PGP, Version 6.5.1; Jun. 1999; pp. 1-88.
Turnbill, Jim; "Cross-Certification and PKI Policy Networking"; Entrust, Inc; Aug. 2000; pp. 1-10.
Some Suggestions for Automatic Encryption and Identity Verification in the IBM Internal Computing Network; Dec. 28, 1985; pp. 1-13.
Arthur, Dwight; AADS Option for Buyer Authentication; Response to NACHA/IC ANT 2 RFI; Sep. 14, 1998; pp. 1-3.
Internet Counsel; Consumer Internet Purchases Using A TM Cards Successfully Processed by NACHA Pilot Participants; Feb. 23, 2003; pp. 1-4.
Internet Counsel; NACHA to Test A TM Card Payments for Consumer Internet Purchases; Feb. 23, 2003; pp. 1-3.
News Release: Digital Signatures Can Secure ATM Card Payments on the Internet, NACHA Pilot Concludes; Jul. 23, 200 I; pp. 1-2.
Kutler, Jeffrey; Privacy Broker: Likely Internet Role for Banks? Digital Frontiers; Oct. 8, 1998; pp. 1-6.
Hettinga, Bob, Hettiga's Best of the Month, Journal of Internet Banking and Commerce; Array Development, Mar. 31, 1999, web site at http://www.arraydev.com/commerce/JIBC/9801-20.htm. pp. 1-4.
Denny, Stephanie, The Electric Commerce Challenge, Journal of Internet Banking and Commerce; Array Development, Mar. 31, 1999, web site at http://www.arraydev.com/commerce/JIBC/9811-06.htm. pp. 1-2.
Business Wire, "E-Commerce, Email and E-greeting Cards Combine in New Web Site Designed by Interactive Bureau", Sep. 14, 1999 (abstract), [online] [retrieved on May 1, 2002], retrieved from Proquest Database, 2 pages.
Confinity, Inc., PayPal.com, How PayPal.com Works, download from website http://www.paypal.com on Feb. 7, 2000, 7 pages.
Dotbank, "The Way to Send and Receive Money on the Internet," download from website http://www.dotbank.com, Feb. 7, 2000, 6 pages.
Idealab Company, "PayMe.com," download from website http://ssl.idealab.com on Feb. 16, 2000, 7 pages.
Nystrom, M. et al., "Selected Object Classes and Attribute Types," The Internet Society (2000), 42 pages, November 2000.
PR Newswire, "GiftSpot.com Simplifies Gift-Giving on the Internet," Oct. 20, 1999(abstract), [online] retrieved on May 1, 2002, retrieved from Proquest Database, 5 pages.
Tranz 330 Fast, "Low-Cost Transaction Automation at the Point of Service," http://www.vfi-finance.com/tranz330.htm, VeriForne Finance, pp. 1-3, especially pp. 1-2, Jan. 1999.
x.com, "Do More with Your Money," download from website http://www.x.com., 5 pages, Feb. 7, 2000.

* cited by examiner

METHODS AND SYSTEMS FOR ELECTROMAGNETIC INITIATION OF SECURE TRANSACTIONS

CROSS REFERENCE TO RELATED APPLICATION

This application is a nonprovisional of, and claims the benefit of the filing date of, U.S. Prov. Pat. Appl. No. 60/530,510, entitled "METHODS AND SYSTEMS FOR ELECTROMAGNETIC INITIATION OF SECURE TRANSACTIONS," filed Dec. 17, 2003 by Brian T. Kean, the entire disclosure of which is incorporated herein by reference for all purposes.

BACKGROUND OF THE INVENTION

This application relates generally to information security. More specifically, this application relates to methods and systems for electromagnetic initiation of secure transactions.

In recent years, a number of proposals have been put forth to expand the flexibility with which consumers may provide access to accounts when engaging in financial transactions. Currently, there are a number of different types of transactions that permit such access, such as debit transactions, credit transactions, and stored-value transactions. For example, debit transactions may provide information during the transaction regarding a demand-deposit, checking, or savings account so that a debit of funds may be applied directly to the account substantially contemporaneously with the transaction. In the case of a credit transaction, account information provided during the transaction may define a credit account against which the customer may charge funds up to a predefined credit limit. Similarly, account information provided during a stored-value transaction identifies a stored-value account against which the customer is authorized to debit funds.

Because of its sensitive nature, a major concern when handling financial-account information during such transactions is the security of the information. Currently, the most common way to ensure that the information is treated securely is to provide the information on a magnetic stripe that is affixed to a plastic card entrusted to the control of the customer. The magnetic-stripe image on the card is read during a transaction with a magnetic-stripe reader and transmitted for approval by an entity responsible for the identified financial account. In some instances, a personal identification number may be required to support the transaction, but not in other instances.

Many proposals to allow radio-frequency ("rf") initiation of transactions do nothing more than suggest loading the magnetic-stripe image onto an rf chip. These suggestions fail to account for additional security and authentication schemes that would add extra processing to the authorization system or add extra complexity to the chip, but which would be needed to ensure the security of the financial-account information. There is accordingly, a general need in the art for methods and systems that provide for electromagnetic initiation of transactions that maintain the security of the information.

BRIEF SUMMARY OF THE INVENTION

Embodiments of the invention thus provide methods and systems for processing secure transactions that make use of electromagnetic initiation of the transactions. In a first set of embodiments, a method is provided for processing a secure transaction. An electromagnetic transmission packet is received from a portable device at a processing device. The electromagnetic transmission packet includes an encrypted magnetic-stripe image and an encrypted version of an alphanumerical identifier. A keyed nonencrypted version of the alphanumerical identifier is received at the processing device, and the encrypted version of the alphanumerical identifier is decrypted. The decryption of the encrypted version of the alphanumerical identifier is compared with the nonencrypted version of the alphanumerical identifier. Thereafter, a decryption of the encrypted magnetic-stripe image is transmitted to a host system for processing the secure transaction using an account identified by the decryption of the magnetic-stripe image.

In some instances, the electromagnetic transmission packet is received at a radio frequency. Further, in some embodiments, a barcode scan of a barcode may also be received, with a barcode value that corresponds to the barcode being transmitted with the decryption of the encrypted magnetic-stripe image. The validity of the barcode may also be verified, such as by calculating a check digit from characters comprised by the scanned barcode and comparing the calculated check digit with a comparison check digit comprised by the scanned barcode. In one embodiment, an antenna is activated to receive the electromagnetic transmission packet only after verifying the validity of the barcode, with the antenna being deactivated after receiving the electromagnetic transmission packet, thereby providing electrical savings and reducing signal-pollution radiation. In other embodiments, the alphanumerical identifier may be transmitted with the decryption of the encrypted magnetic-stripe image.

In some cases, an identification of the processing device and a transaction identifier may be transmitted to the portable device. The electromagnetic transmission packet further includes an encryption of the transaction identifier and the identification of the processing device. The encryption of the transaction identifier and the identification of the processing device may be decrypted by the processing device. The decryption of the transaction identifier and the identification of the processing device may then be compared with the identification of the processing device and the transaction identifier transmitted to the portable device. In one embodiment, a symmetric-key encrypted portable-device transaction counter and incremented processing-device transaction counter are received. The portable-device transaction counter and incremented processing-device transaction counter are decrypted. A different is calculated between the decrypted portable-device transaction counter and the decrypted incremented processing-device transaction counter to verify that the portable device was able to decrypt an original encrypted value. In one embodiment, the portable-device transaction counter is further transmitted to a host for fraud detection.

In various embodiments, the electromagnetic transmission packet may further include a digital signature, the authenticity of which may be verified as part of the method. The encrypted magnetic-stripe image may be encrypted with a variety of techniques, including an elliptic-curve cryptographic technique. Also, in some embodiments, the electromagnetic transmission packet may additionally included nonencrypted information. For example, the nonencrypted information may comprise a key identification that defines a key for decrypting the encrypted magnetic-stripe image.

In a second set of embodiments, a processing device is provided for processing a secure transaction. The processing device comprises a radio-frequency antenna, a keypad equipped for receipt of entry of alphanumerical strings, a communications system, and a processor. The processor is provided in communication with the radio-frequency antenna, the keypad, and the communications system and is coupled with a computer-readable storage medium. The computer-readable storage medium has a computer-readable program embodied therein for directing operation of the processor to implement the methods described above.

In a third set of embodiments, a portable device is provided for use in processing a secure transaction. The portable device comprises a radio-frequency antenna, a memory device, an activation switch, and a processor. The processor is provided in communication with the radio-frequency antenna, the memory device, and the activation switch. The memory device has a computer-readable program embodied therein for transmitting a radio-frequency transmission packet that includes an encrypted magnetic-stripe image and an encrypted version of an alphanumerical identifier to a processing device. The transmission is performed with the radio-frequency antenna and in accordance with a state of the activation switch.

In some such embodiments, the computer-readable program further includes instruction for receiving, with the radio-frequency antenna, an identification of the processing device and a transaction identifier. The identification of the processing device and the transaction identifier are encrypted, with the encrypted versions being transmitted to the processing device as part of the radio-frequency transmission packet. The states of the activation switch may define on and off states of the portable device in some embodiments. In other embodiments, the states of the activation switch define which of a plurality of accounts is to be used for the secure transaction. A default of the plurality of accounts may require correct identification of the alphanumerical identifier. The activation switch may comprise a membrane switch. In some cases, the portable device may also comprise a plurality of input ports for payment modules, with the encrypted magnetic-stripe image defining at least one of the payment modules. The payment modules may comprise stored-value modules, debit modules, credit modules, and the like, and may be provided in the form of support interface modules ("SIMs").

In a fourth set of embodiments, a system is provided for processing secure transactions. The system comprises a host system, a plurality of processing devices such as those described above, and a plurality of portable devices such as those described above. Processors comprised by the processing devices and the portable devices are configured to process the secure transactions in accordance with the methods described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods and systems for processing secure transactions that use electromagnetic initiation. These embodiments make use of a combination of a processing device that is typically located at a transaction point and a portable device that is typically carried by the customer. Sometimes, the transaction point is referred to herein as a "point of sale," although such usage is not intended to limit the nature of the transaction, which may be for a sale of goods, for a service, or for any transaction in which funds are exchanged between parties. The description below sometimes makes specific reference to electromagnetic communications at radio frequencies, although the invention is not intended to be limited to rf applications and may be used at other frequencies in alternative embodiments.

Figure 1:
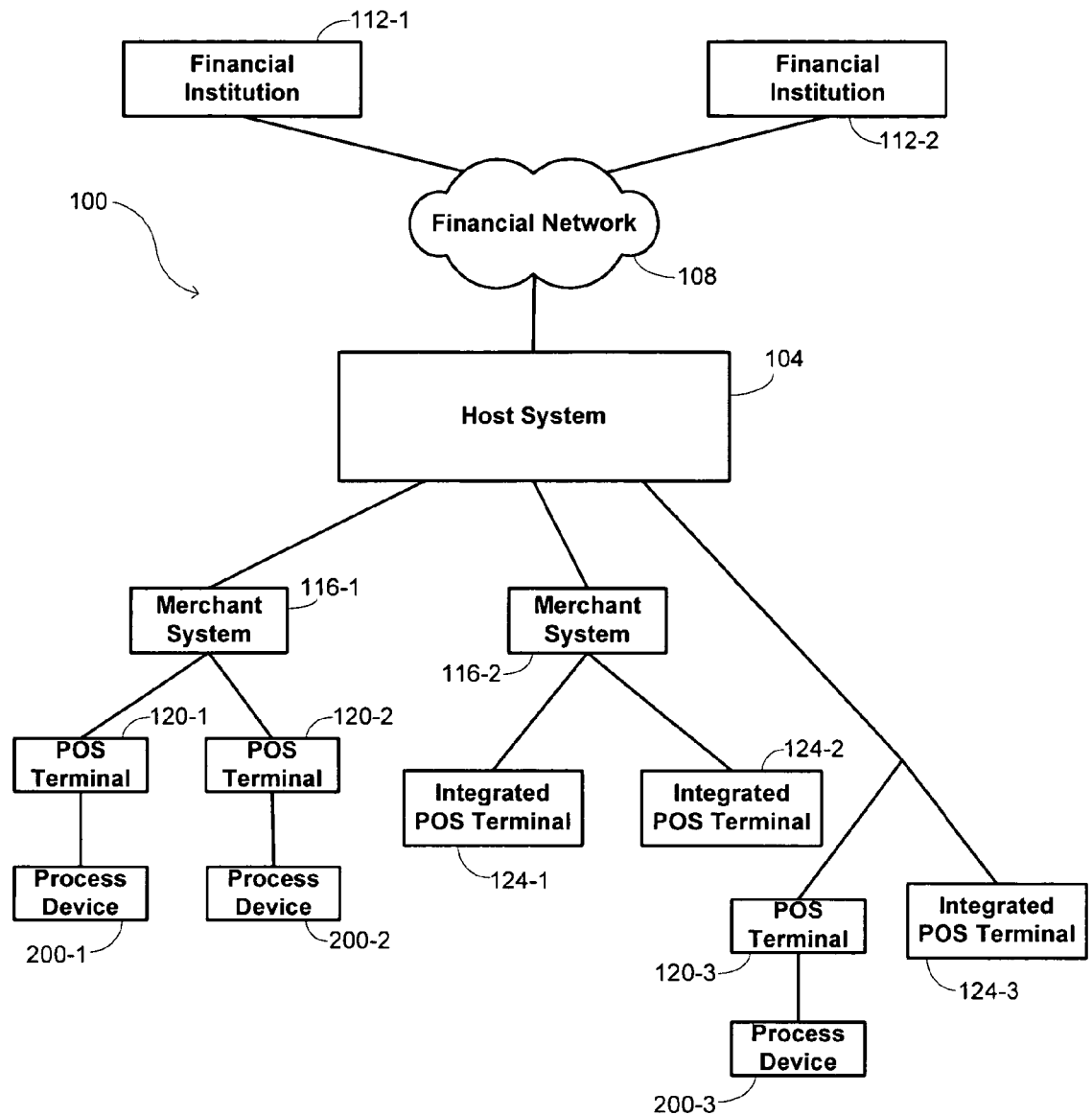
FIG. 1 provides a schematic illustration of the structure of a system that allows processing of secure transactions in an embodiment of the invention.

An overview of a system that allows the use of the processing device and the portable device in processing secure transactions is provided in FIG. 1, in which the overall architecture of the system is denoted 100. As this figure illustrates, the processing device may be provided in some instances as a satellite device in communication with an existing point-of-sale terminal; alternatively, it may be provided as part of an integrated point-of-sale terminal that combines the functionality described herein with that of existing point-of-sale devices. Such versatility advantageously allows existing systems to be upgraded to accommodate the embodiments described herein by interfacing the satellite device with existing equipment. At the same time, it is possible to substitute existing equipment with the integrated point-of-sale terminals when equipment is undergoing an upgrade.

In FIG. 1, there are three examples where the process device 200 is provided as a satellite device in communication with an existing point-of-sale terminal 120, i.e. in the case of process devices 200-1, 200-2, and 200-3. In each of these instances, the point-of-sale terminal 120 may have the structure and functionality of existing equipment configured for communication with a host system 104 in processing transactions. In some cases, such existing equipment may already be configured to accommodate a variety of different transaction instruments by including, for example, payment-information-entry components, signature-capture components, keypads, keyboards, display screens, biometric-data-capture components, speakers, printers, processors, software, memory, communication devices, and the like. Examples of such multifunction point-of-sale terminals are provided in the following commonly assigned applications, the entire disclosures of which are incorporated herein by reference for all purposes: U.S. Prov. Pat. Appl. No. 60/147,889, entitled "INTEGRATED POINT OF SALE DEVICE," filed Aug. 9, 1999 by Randy J. Templeton et al.; U.S. patent application Ser. No. 09/634,901, entitled "POINT OF SALE PAYMENT SYSTEM," filed Aug. 9, 2000 by Randy J. Templeton et al.; U.S. patent application Ser. No. 10/116,689, entitled "SYS- TEMS AND METHODS FOR PERFORMING TRANSACTIONS AT A POINT-OF-SALE," filed Apr. 3, 2002 by Earney Stoutenburg et al.; U.S. patent application Ser. No. 10/116,733, entitled "SYSTEMS AND METHODS FOR DEPLOYING A POINT-OF-SALE SYSTEM," filed Apr. 3, 2002 by Earney Stoutenburg et al.; U.S. patent application Ser. No. 10/116,686, entitled "SYSTEMS AND METHODS FOR UTILIZING A POINT-OF-SALE SYSTEM," filed Apr. 3, 2002 by Earney Stoutenburg et al.; and U.S. patent application Ser. No. 10/116,735, entitled "SYSTEMS AND METHODS FOR CONFIGURING A POINT-OF-SALE SYSTEM," filed Apr. 3, 2002 by Earney Stoutenburg. FIG. 1 also provides three examples where the process device is integrated as part of a multifunction point-of-sale terminal 124, i.e. in the case of integrated point-of-sale terminals 124-1, 124-2, and 124-3. The point-of-sale terminals 120 and integrated point-of-sale terminals 124 are sometimes referred to collectively herein as "transaction-point devices."

In addition, FIG. 1 illustrates that there may be a variety of different ways in which communications may be effected between the transaction-point devices and a host system 104 that manages interactions with a financial network in processing the transactions. For instance, the transaction-point devices may be provided in direct communication with the host system, as illustrated for point-of-sale terminal 120-3 and integrated point-of-sale terminal 124-3. More usually, however, interactions with the host system 104 proceed through one or more intermediary systems, such as through the merchant systems 116 shown in the drawing. Such a merchant system 116 may be used, for instance, to coordinate transactions received at a single merchant location that has multiple transaction-point devices, or may be used to coordinate transactions received at multiple merchant locations for a single merchant entity. In some cases, there may be a hierarchy of such systems intermediate between the transaction-point devices and the host system 104, with each of such systems being configured to route information to or from the host system 104 as appropriate.

In processing transactions, the host system 104 is provided in communication with one or more financial institutions 112, usually through a private financial network 108 that so that it is less likely to be compromised than a public network. The financial institutions 112 usually maintain or have access to maintenance information for financial accounts identified in information transmitted to the host system 104 from the transaction-point devices. For example, in the case of a debit transaction, the financial institution 112 may comprise a bank that maintains a demand-deposit account to be debited in accordance with the terms of the transaction. In the case of a credit transaction, the financial institution 112 may comprise a credit-card company that provides funds on a credit basis to customers in accordance with preset credit limits. In the case of a stored-value transaction, the financial institution may be a company that maintains records of stored-value balances for a variety of different merchant labels, perhaps providing mechanisms for reloading value and performing other maintenance functions.

Figure 2A:
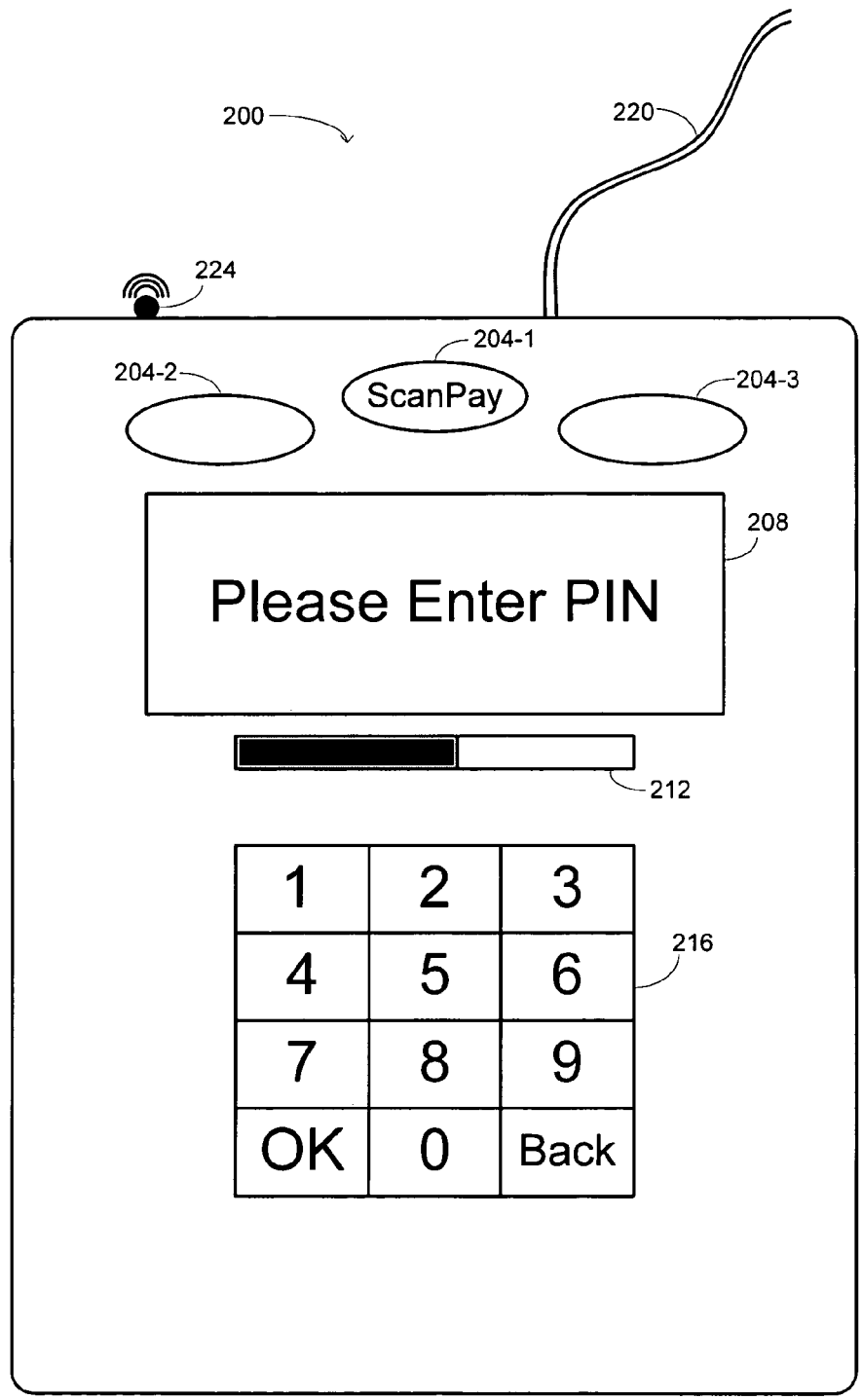
FIG. 2A provides an illustration of a structure for a processing device used in processing secure transactions in an embodiment of the invention.
Figure 2B:
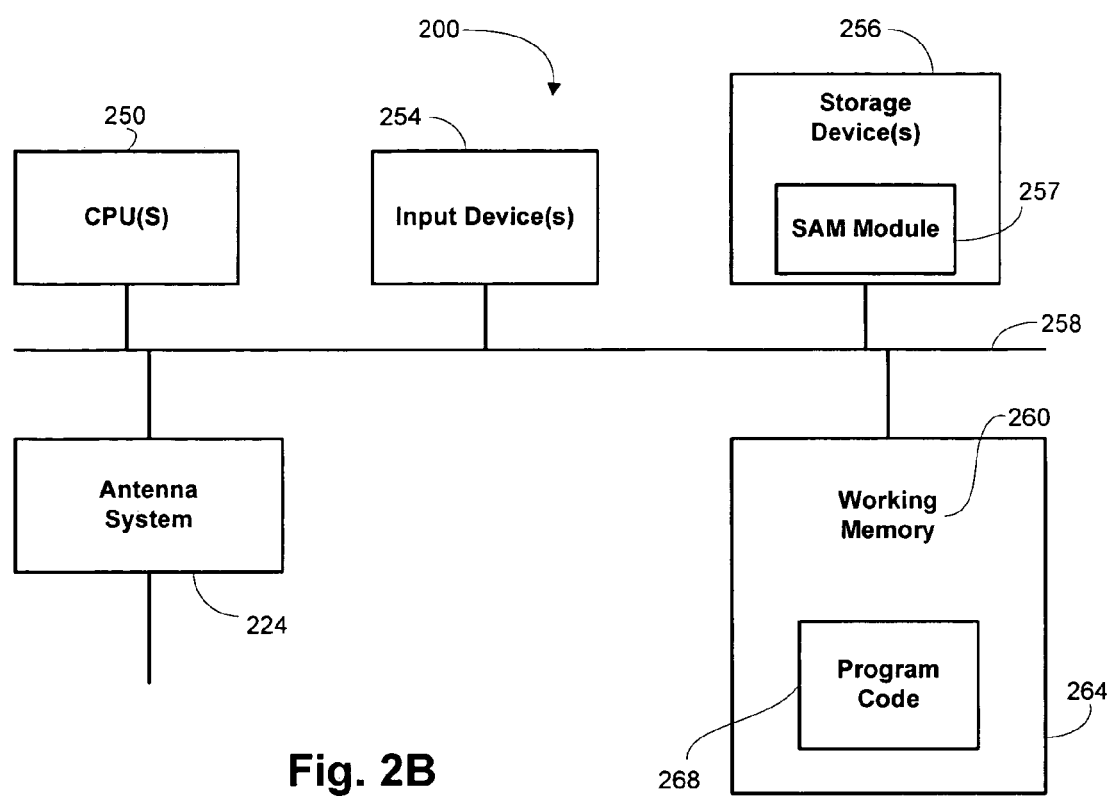
FIG. 2B provides a schematic illustration of a computational structure embodied by the processing device in embodiments of the invention.

An example of a structure that may conveniently be used for the processing devices 200 is shown for one embodiment in FIGS. 2A and 2B. While FIG. 2A provides an illustration of an external physical structure for the processing device 200, FIG. 2B provides an illustration of components that are usually included internal to the device. The external structure shown in FIG. 2A provides a number of elements that conveniently allow the customer to interface with the device. An antenna 224, which may be optimized for operation at radio frequencies in some instances, allows the processing device 200 to interact with the portable device as described in greater detail below. In addition to the electromagnetic interactions enabled by the antenna 224, the processing device includes a keypad 216 that allows entry of a nonencrypted version of an alphanumerical identifier. As used herein, an "alphanumerical identifier" may have only alphabetic components, may have only numerical components, or may have a combination of alphabetic and numerical components. The illustration in FIG. 2A provides an example where the keypad 216 is equipped to permit entry of an alphanumerical identifier consisting of numerical components. A display 208 permits instructions to be communicated to the customer and a status bar 212 provides an indication that processing steps are being taken. The status bar 212 may be adapted for display in different colors, such as red and green, depending on operations that are being performed and to indicate the successful completion of those operations, progressively illuminating more of the status bar as the terminal completes each phase of the transaction. A set of transaction-selection buttons 204 may be used to select among a number of different services accommodated by the processing device, one of which, i.e. button 204-1, corresponds to the specific service described herein. A terminal interface cable 220 may be used to provide a mechanism for exchange of information between the processing device 200 and a point-of-sale terminal 120, although other mechanisms may alternatively be used, including wireless mechanisms.

FIG. 2B provides one example of a functional arrangement of components that may be embodied by the processing device 200 to implement the functions described herein, although other functional arrangements may be used in alternative embodiments. FIG. 2B broadly illustrates how individual system elements for the processing device 200 may be implemented in a separated or more integrated manner. The processing device 200 is shown comprised of hardware elements that are electrically coupled via bus 258, including a processor 250, one or more input devices 254, one or more storage devices 256, and the antenna system 224. Information used in implementing the methods described below, such as encryption-key information, is stored on the storage devices 256, which may, for instance, comprise secure-access memory ("SAM") 257. In addition to the keypad 216, for example, the input devices 254 might comprise a smart-card reader slot to allow injection of data to the processing device 200, such as the encryption keys, software upgrades, and the like.

The processing device 200 also comprises software elements, shown as being currently located within working memory 260, including program code 268 designed to implement methods of the invention. It will be apparent to those skilled in the art that substantial variations may be used in accordance with specific requirements. For example, customized hardware might also be used and/or particular elements might be implemented in hardware, software (including portable software, such as applets), or both. Further, connection to other computing devices such as network input/output devices may be employed.

It is noted that the structure shown in FIG. 2B may also be used in embodiments where an integrated point-of-sale terminal 124 is provided. In such embodiments, a number of output devices may be provided in communication with the bus 258 and a greater number of input devices 254 may be available, such as payment-information-entry components, signature-capture components, keypads, keyboards, display screens, biometric-data-capture components, speakers, printers, processors, software, memory, communication devices, and the like. In addition, the program code 268 may include instructions that implement functions of a separated point-of-sale terminal 120 as well functions of the processing device.

Figure 3:
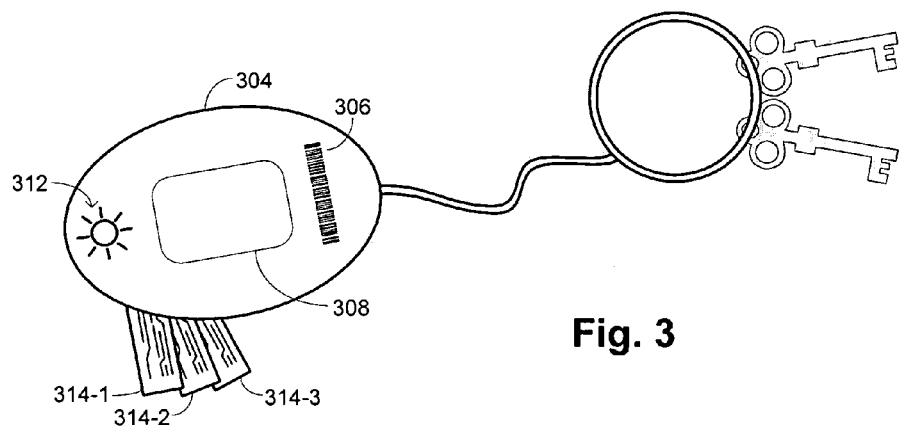
FIG. 3 provides an illustration of a structure for a portable device used in processing secure transactions in an embodiment of the invention.

An example of the portable device is provided in FIG. 3 in the form of a key fob 304, which may conveniently be carried by customers. The portable device includes memory that may be used to hold encrypted versions of the magnetic-stripe image and alphanumerical identifier. The magnetic-stripe image and alphanumerical identifier may conveniently be encrypted using the same key, although this is not required. As used herein, the "magnetic-stripe image" that is stored in memory by the portable device is intended to refer to account information of the type that is commonly stored on magnetic-stripe tracks. For example, the information may be stored in a format that has a correspondence to the ISO/IEC 7810, 11, 12, and 13 series of standards, which specify a three-track format, storage scheme, and bit density for all financial card applications. While the information may conveniently be stored in a format that mimics the magnetic-stripe organization, with different types of information being associated with different tracks, references to such a magnetic-stripe image are intended more broadly to encompass any organization of the information. For example, the magnetic-stripe image may comprise an identification of a financial account and of a financial institution that holds the financial account in the form of an account number coupled with a bank identification number ("BIN"). In addition, information identifying the customer by name, an expiration date, and various check characters may be included, although the specific information content of the magnetic-stripe image may vary according to such factors as the issuer, the type of accounts accommodated, the status of the customer, and the like.

The encryption of the magnetic-stripe image and of the alphanumerical identifier may result from a variety of different types of encryption methods in different embodiments. For example, in one embodiment, they are encrypted according to an elliptical curve cryptography ("ECC") scheme, which is an example of an asymmetric encryption scheme. In cases where there are potentially multiple issuers to be accommodated by the host system 104, the use ECC encryption may function by implementing an elliptical curve master public/private ECC key pair, which may be rotated periodically to enhance security. Key pointers are then used to associate individual issuers with a master ECC key index number. By using ECC keys in this way, it is sufficient to load the master ECC public key(s) onto the processing devices 200. The individual issuer ECC key is then encrypted under the master ECC private key and included on the portable devices 304. This thereby limits the number of keys that need to be loaded and managed on the processing devices 200 and SAM module 257, and enhances the scalability of the system. Encryption of the magnetic-stripe image and alphanumerical identifier may then be encrypted by the master ECC private key, creating an ECC certificate that incorporates the individual issuers' key pointers.

In other embodiments, such a hierarchy of encryptions may be avoided, with appropriate public and private keys being loaded onto the processing and portable devices 200 and 304. Also, a variety of other types of encryption techniques well known to those of skill in the art may alternatively be used, such as with the well-known Data Encryption Standard ("DES") and the like. One use of a symmetric key is in the encryption of an identifier for the portable device, which may comprise a barcode as described further below, when sending it from the terminal to the portable device, as described in detail below.

The portable device 304 shown in FIG. 3 may include a variety of mechanisms that enhance the security of the transactions even beyond the use of encryption. For instance, a switch 308 may be used to prevent "pocket surfing," in which electromagnetic transmissions from the portable device are captured with the intention of using the received information fraudulently. The switch 308 acts as a physical security measure that may be implemented so that useable electromagnetic signals are only transmitted when the switch is activated. A light-emitting device ("LED") 312 or other indicator may be provided on the portable device to indicate activation by the switch. In one embodiment, the switch 308 comprises a membrane switch, although other switch configurations may alternatively be used.

Figure 4A:
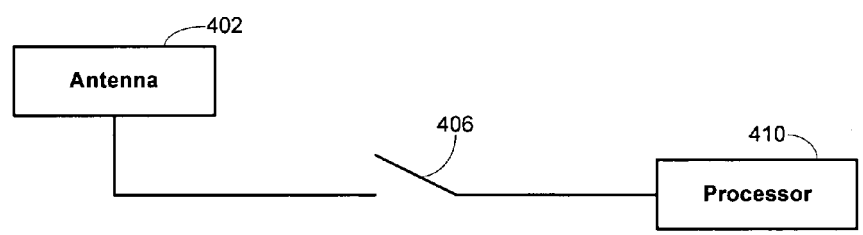
FIGS. 4A and 4B provide illustrations of switching structures that may be used in the portable device in different embodiments of the invention.
Figure 4B:
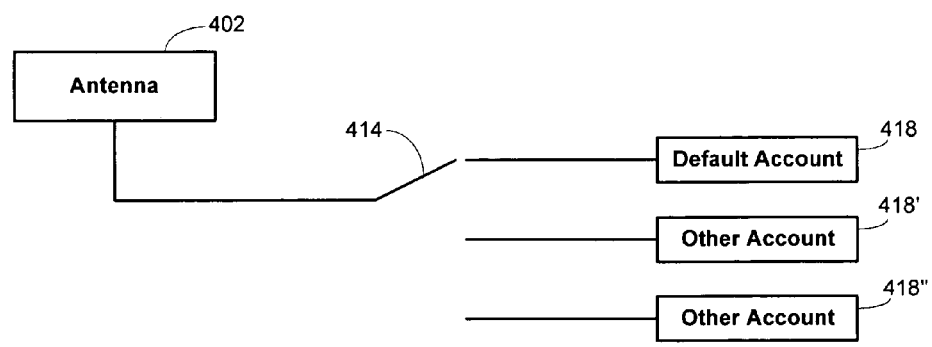

There are a number of different ways in which such a switch may function, as illustrated with FIGS. 4A and 4B for different embodiments. For example, in the embodiment illustrated in FIG. 4A, the switch 406 may be configured so that no signal is provided from a processor 410 comprised by the portable device 304 to an antenna 402 comprised by the portable device 304 unless activated. In such an embodiment, no electromagnetic signal is thus transmitted, and therefore cannot be pocket surfed, unless the customer is activating the switch at the time of the transaction. In the embodiment illustrated in FIG. 4B, the switch 414 may instead be configured so that a magnetic-stripe image associated with different accounts is transmitted depending on a state of the switch 414. For example, the default account 418 might correspond to an account that requires a PIN in order to effect transactions so that the magnetic-stripe image alone is insufficient. Protection against pocket surfing is thereby provided by assigning such an account as the default, and by requiring activation of the switch 414 to access the magnetic-stripe image for a different account 418' or 418". In some cases, as FIG. 4B illustrates, the switch may comprise a multiposition switch so that more than two states may be accommodated, permitting access to a greater number of accounts with a single portable device 304.

FIG. 3 also illustrates a further security feature that may be included in the form of a barcode that is printed on the portable device 304. Confirmation of a valid barcode during a transaction may be used as described below to confirm that a transaction is being performed while the portable device 304 is present. Confirmation of such presence thus acts as a further mechanism that prevents pocket surfing from being used to commit fraud since the printed barcode cannot be appropriated simply by detecting ambient electromagnetic signals (sometimes referred to as a "pocket-surfing attack").

In some embodiments, the portable device 304 may be equipped with input ports that allow for access of payment modules 314. In such an embodiment, the modules 314 may be accessible with a bladelike configuration that permits individual modules to be removed from an interior of the portable device 304. Identification of a particular module may result in identification of a corresponding account by the portable device 304, such as by using the swivel action to trigger a switch within the portable device 304 to identify the account. The magnetic-stripe image that is communicated by the portable device 304 may then correspond to the magnetic-stripe image for the identified account. In this way, the portable device 304 may act as a convenient holder for payment modules 314, thereby simplifying organization of multiple stored-value accounts that may be maintained by a customer.

Furthermore, in some embodiments, the modules 314 and/or the portable device 304 may be sold with an automated dispenser that allows consumer selection of gift or other stored-value cards for specific merchants, initial values, and the like. For example, the modules 314 may be sold in such a device located in a mall or other place, and equipped to activate and release a selected payment module 314 upon payment by a customer. The payment could be made with a cash receiver, a magnetic-stripe card reader, or, in some cases, with a processing device 200 such as the one described herein for enabling electromagnetic initiation of secure transactions. Upon receipt of payment, a financial institution responsible for administering the purchased stored-value is notified of the sale so that the corresponding account may be loaded with the purchased amount. The dispensing machine reads electromagnetic identifications from the modules as they are dispensed and associates those identifications with the corresponding stored-value accounts. Such an arrangement thus provides a convenient mechanism for the sale of payment modules, and relieves customers who maintain multiple stored-value accounts of the need to hold multiple magnetic-stripe cards.

Figure 5A:
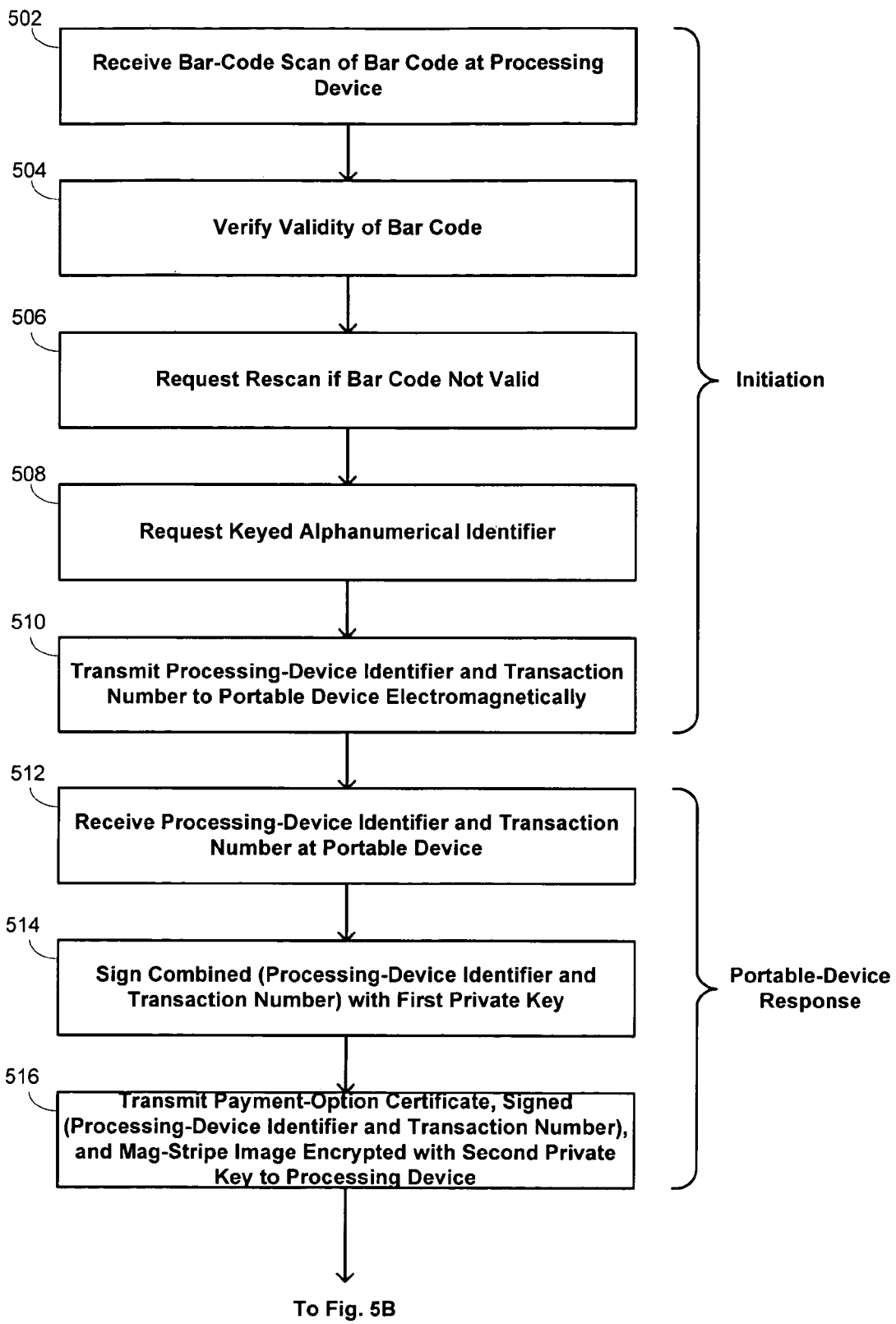
FIGS. 5A-5C proved a flow diagram illustration how secure transactions may be processed in certain embodiments of the invention.
Figure 5B:
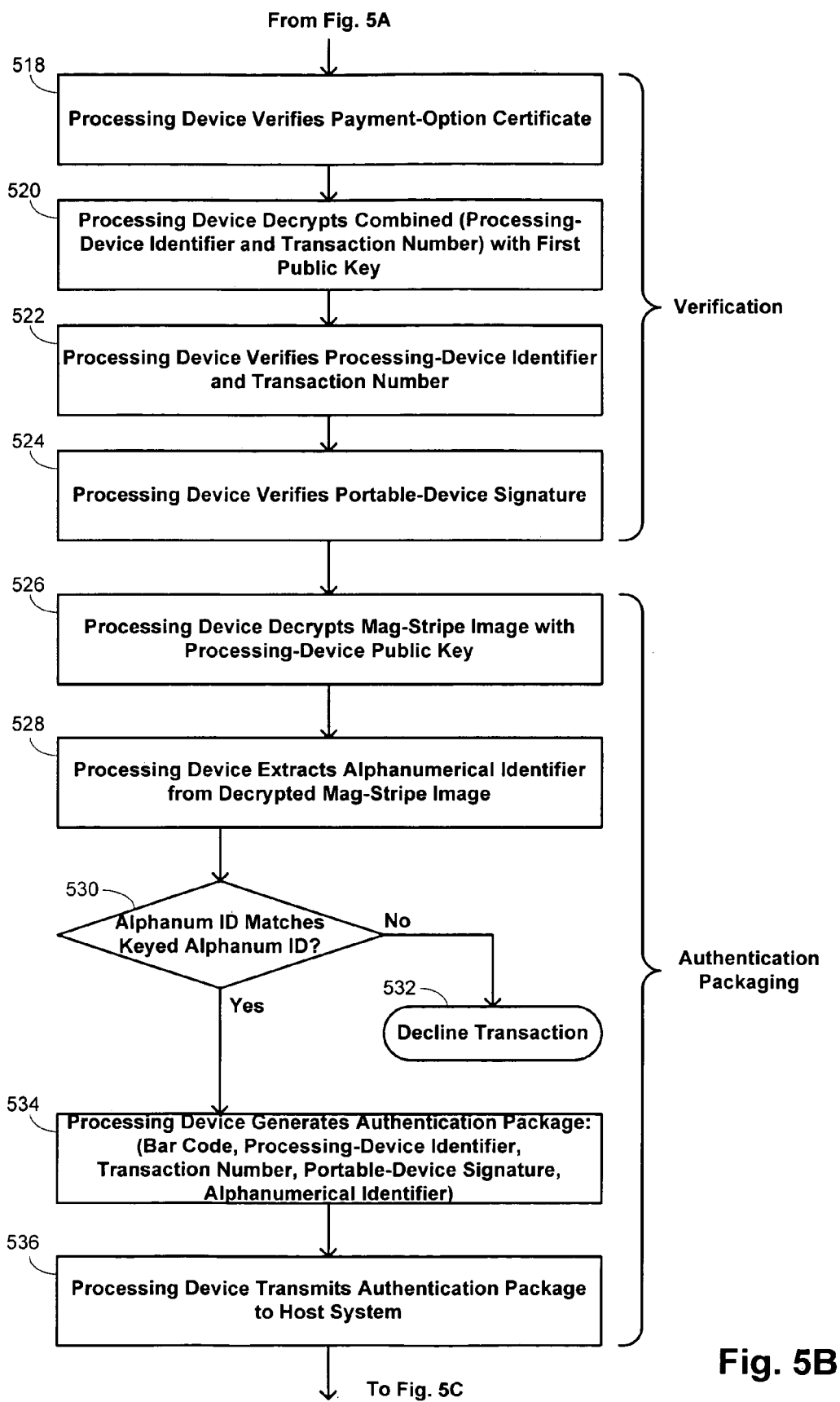
Figure 5C:
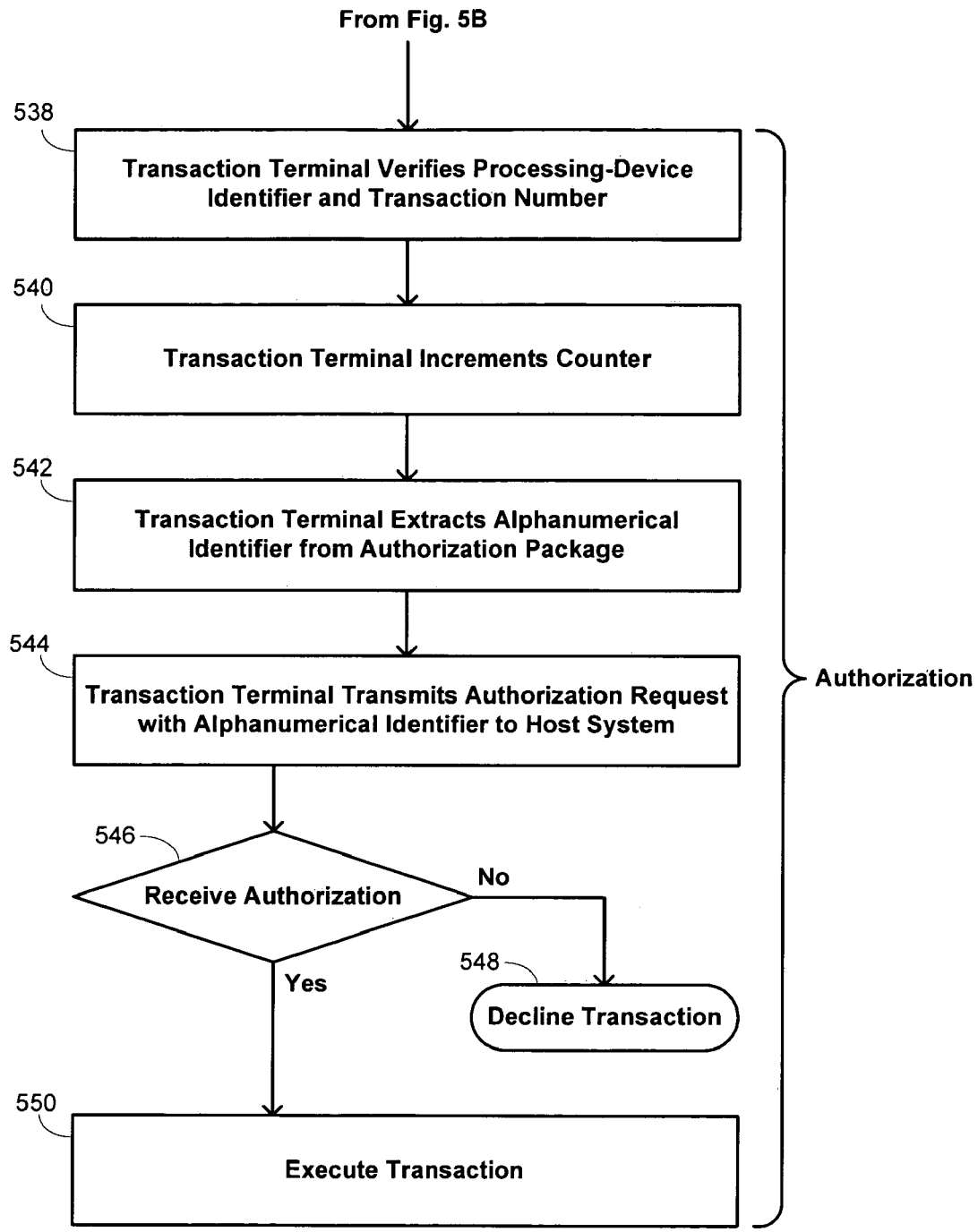

FIGS. 5A-5C provide a flow diagram that illustrates how secure transactions may be processed with electromagnetic initiation using the structural arrangements described above. Such processing may be initiated using an arrangement having a separated processing device 200 and point-of-sale terminal 120, or may be initiated using an integrated point-of-sale terminal 124 equipped with combined functionality. The flow diagram presented in FIGS. 5A-5C may be considered to provide a single flow despite its presentation in multiple parts, and certain portions of the flow diagram are additionally identified by labels corresponding to logical portions of the process flow. While the order of the blocks in the flow diagram sets forth an exemplary order, this order is not necessary and in some alternative embodiments a different order may be followed, or some of the steps represented by the blocks may be performed simultaneously. Furthermore, some alternative embodiments include steps in addition to those depicted explicitly in the drawing and other alternative embodiments omit some steps that are depicted in the figures.

Blocks 502-510 of FIG. 5A collectively correspond to an initiation phase of a transaction when a customer presents himself at a point of sale and indicates a desire to engage in a transaction. At block 502, a scan of the barcode printed on the portable device 304 may be received by having the customer respond to a request to present the barcode to the barcode scanner on the processing device 200. In some instances, the validity of the barcode may be verified as indicated at block 504, usually at this stage by verifying a structure of the barcode. For example, the barcode may be checked to ensure that it has a required number of characters and that its format is as otherwise expected. In addition, the barcode may sometimes comprise a check character that is defined by application of a specified algorithm to other characters comprised by the bar code; the check character may be verified by comparing it with the result of applying the specified algorithm. If the barcode is found not to be valid as a result of such checks, a request may be made to have the barcode rescanned as indicated at block 506. At block 508, a request is presented to the customer on the display of the processing device 200 to key in an alphanumerical identifier, which may take the form of a numerical identifier such as a PIN. The processing device 200 initiates an electromagnetic transmission to the portable device 304 at block 510. The electromagnetic transmission may take place at radio frequencies and includes an identifier for the processing device and a transaction number.

At blocks 512-516, the portable device 304 responds to the transmission from the processing device 200 in a manner that enhances the security of the transaction by ensuring that it is not a replay or a deliberate hack. The processing-device identifier and transaction number are received by the portable device 304 at block 512. The portable device 304 concatenates the processing-device identifier and the transaction number and signs the combination with a first private key at block 514. At block 516, this signed combination is transmitted electromagnetically back to the processing device 200 as part of an electromagnetic transmission packet that additionally includes information to be used in effecting the transaction. In particular, a payment-option digital certificate with encrypted magnetic-stripe image are included as part of the electromagnetic transmission packet. Which of a plurality of magnetic-stripe images is included may depend on a state of the portable device 304, such as described above in connection with different states that may be realized by the customer selecting different states of the switch 308. The magnetic-stripe image is encrypted using a second private key, usually prior to being stored on the portable device 304.

Alternatively, a symmetric key, such as a DES key, may be used to encrypt the portable-device identifier and transaction number being sent to the portable device. The portable device decrypts using a stored DES key, increments the transaction count by an internally held portable-device transaction counter, and sends it back to the terminal encrypted under the same or a different DES key. The internally held transaction counter is itself incremented by one. The transmission may include the portable-device transaction counter together with the incremented terminal transaction counter. The terminal determines the difference between the two values to verify that the portable device was able to decrypt the original value, and the portable-device transaction counter may be sent to the host for various fraud-detection purposes. In addition, during this process, the barcode value or other identifier may be verified as being correct.

At blocks 518-524, the processing device 200 performs a set of verification functions to ensure the authenticity of the information received, to ensure that the received transmission is not the result of a replay or hack, and to ensure that the presence of the portable device 304 during the transaction. At block 518, the processing device 200 verifies that the payment-option certificate conforms to a predetermined set of requirements, thereby ensuring that the portable device 304 is one recognized within the system. At block 520, the processing device 200 decrypts the combination of the processing-device identifier and the transaction number with a first public key. The first private key and the first public key define a private/public key combination within whatever encryption scheme is used. At block 522, the decrypted processing-device identifier and transaction number are compared with what the processing device 304 previously transmitted, thereby verifying that the received transmission is not a replay or hack. At block 524, the signature affixed to the combination by the portable device 304 is verified in accordance with the decryption to verify the presence of the portable device 304.

After performing such verifications, the processing device packages an authentication package to be transmitted to the host system 104 to seek authorization for the transaction in accordance with the policies of the responsible financial institution and 112 and the status of the identified account. Thus, at block 526, the processing device 200 decrypts the received magnetic-stripe image with a second public key, the second private key and second public key defining a private/public key combination within the applicable encryption scheme. At block 528, the alphanumerical identifier is extracted from the decrypted payment digital certificate by the processing device 200. This allows a comparison to be performed between the extracted alphanumerical identifier and the alphanumerical identifier that was keyed at block 508. If the two fail to match, as checked at block 530, the transaction is declined at block 532. If there is a match, then the processing device 200 generates the authentication package at block 534 for transmission at block 536. In the illustrated embodiment, the processing device 200 is a satellite device provided in communication with a point-of-sale terminal 120 so that the transmission is made to the point-of-sale terminal 120, which performs certain authorization functions described below. In other embodiments, the transmission may be made in a manner to transmit the necessary authorization information to the host system 104 through the architecture discussed in connection with FIG. 1. The authentication package may include whatever pieces of information are needed or requested by the host system 104 to coordinate soliciting authentication for the transaction. In the illustrated embodiment, the authentication package includes a barcode value corresponding to the barcode, the processing-device identifier, the transaction number, the portable-device signature, and the alphanumerical identifier.

According to embodiments of the invention, the comparison of the keyed alphanumerical identifier with the decrypted alphanumerical identifier is performed offline, meaning that such a comparison is performed prior to transmission of the authorization package to the host system 104. Conveniently, such an offline comparison is performed in the illustrated embodiment by the processing device 200, although more generally the offline comparison may be performed by any component of the system architecture 100, such as by the merchant system 116, prior to transmission of the authorization package to the host system 104. There are a number of benefits to performing the comparison of alphanumerical identifiers offline. For example, the offline comparison provides a fast and efficient mechanism by which it can be verified both that the portable device 304 is present during the transaction and that the individual presenting it is authorized to do so.

As previously noted, there are some transactions in which authorization may be provided without an alphanumerical identifier. For example, credit transactions and stored-value transactions are frequently authorized without alphanumerical identifiers while debit transactions typically require validation of an alphanumerical identifier in the form of a numerical PIN by the financial institution 112. Thus, in some embodiments, the authorization package may omit the alphanumerical identifier even where it has been verified offline. In other embodiments, inclusion of the alphanumerical identifier in the authorization package may be avoided for all transactions by instead including a flag that indicates that the alphanumerical identifier has been confirmed offline. In other embodiments, the offline comparison may be avoided altogether in order to increase the transaction time. In such alternative embodiments, the presence of the portable device 304 may be verified by decryption of the magnetic-stripe image and checking check values embedded within the magnetic-stripe image. Such check values might correspond to different magnetic-stripe tracks or could be global check values that apply to the magnetic-stripe image as a whole. In some embodiments, an additional control mechanism is provided by imposing a maximum transaction dollar limit for transactions executed without validation of an alphanumeric identifier. Such a maximum transaction dollar limit may be conveniently stored on the portable device 304 and transmitted to the processing device 200 during a transaction with the information at block 516. The processing device 200 may then include additional programming to decline any transaction that exceeds the limit unless an alphanumerical identifier is verified. Thus, if a portable device is lost, the potential fraud exposure is limited to the maximum amount. Known fraud-detection mechanisms that identify such scenarios as attempting a large number of small transactions in a short period of time may also be implemented.

After the authorization package is transmitted from the processing device 200, the transaction may be authorized at blocks 538-550 of FIG. 5C. Initially, as indicated at block 538, the processing-device identifier and transaction number may be verified by one of the intermediary devices between the processing device 200 and the host system 104. In this example, where the processing device 200 is a satellite device connected with a point-of-sale terminal 120, the verification of the processing-device identifier and transaction number are performed by the connected point-of-sale terminal 120. At block 540, the point-of-sale terminal 120 increments a counter, which may ensure that duplicate transmissions resulting from receipt of stray electromagnetic signals are not treated as additional transactions. In cases where the authorization requires presentation of an alphanumerical identifier, the alphanumerical identifier is extracted from the received authorization package at block 542. The point-of-sale terminal 120 then transmits an authorization request through the architecture discussed in connection with FIG. 1 to the host system 104 as indicated at block 544. In cases where an alphanumerical identifier is required for authorization, the alphanumerical identifier is transmitted with the authorization request at block 544.

The authorization request at this point may be processed in a fashion identical to processing for magnetic-stripe transactions. The point-of-sale terminal 120 thus awaits a return response at block 546 specifying whether the transaction has been authorized. If so, the transaction is executed at block 550, with appropriate debits and credits being settled in accordance with well-established settlement practices. If the transaction has not been authorized, the point-of-sale terminal 120 declines to execute the transaction as indicated at block 548.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for processing a secure transaction between a customer and a merchant, the method comprising:

receiving, at a merchant processing device, an electromagnetic transmission packet from a customer portable device, wherein the electromagnetic transmission packet includes an encrypted magnetic-stripe image and an encrypted version of an alphanumerical identifier;

transmitting an identification of the merchant processing device and a transaction identifier to the customer portable device, wherein the electromagnetic transmission packet received from the customer portable device further includes an encryption of the transaction identifier and the identification of the merchant processing device;

comparing, at the merchant processing device, the identification of the merchant processing device and transaction identifier received from the customer portable device with those transmitted to the customer portable device;

receiving a keyed nonencrypted version of the alphanumerical identifier at the merchant processing device;

decrypting, with the merchant processing device, the encrypted version of the alphanumerical identifier;

comparing, with the merchant processing device, the decryption of the encrypted version of the alphanumerical identifier with the nonencrypted version of the alphanumerical identifier; and thereafter, transmitting a decryption of the encrypted magnetic-stripe image from the merchant processing device to a host system for executing the secure transaction with the host system using an account identified by the decryption of the magnetic-stripe image;

wherein the comparing steps are performed offline by the merchant processing system before transaction approval is requested from the remote host system, and is performed without involvement from the host system.

2. The method recited in claim 1 wherein the electromagnetic transmission packet is received at a radio frequency.

3. The method recited in claim 1 further comprising:
receiving a barcode scan of a barcode; and
transmitting a barcode value corresponding to the barcode with the decryption of the encrypted magnetic-stripe image.

4. The method recited in claim 3 further comprising verifying a validity of the barcode.

5. The method recited in claim 4 further comprising:
activating an antenna to receive the electromagnetic transmission packet after verifying the validity of the barcode; and
deactivating the antenna after receiving the electromagnetic transmission packet.

6. The method recited in claim 4 wherein verifying the validity of the barcode comprises:
calculating a check digit from characters comprised by the scanned barcode; and
comparing the calculated check digit with a comparison check digit comprised by the scanned barcode.

7. The method recited in claim 1 further comprising transmitting the alphanumerical identifier with the decryption of the encrypted magnetic-stripe image.

8. The method recited in claim 1 further comprising:
decrypting the encryption of the transaction identifier and the identification of the merchant processing device; and
comparing the decryption of the transaction identifier and the identification of the merchant processing device with the identification of the merchant processing device and the transaction identifier transmitted to the customer portable device.

9. The method recited in claim 8 further comprising:
receiving a symmetric-key encrypted portable-device transaction counter and incremented processing-device transaction counter;
decrypting the portable-device transaction counter and the incremented processing-device transaction counter;
calculating a difference between the decrypted portable-device transaction counter and the decrypted incremented processing-device transaction counter.

10. The method recited in claim 9 further comprising transmitting the portable-device transaction counter to a host for fraud detection.

11. The method recited in claim 1 wherein the electromagnetic transmission packet further includes a digital signature, the method further comprising verifying an authenticity of the digital signature.

12. The method recited in claim 1 wherein the encrypted magnetic-stripe image is encrypted using an elliptic-curve cryptographic technique.

13. The method recited in claim 1 further comprising incrementing a counter at the merchant processing device.

14. The method recited in claim 1 wherein the electromagnetic transmission packet further includes nonencrypted information.

15. The method recited in claim 14 wherein the nonencrypted information comprises a key identification, the method further comprising decrypting the encrypted magnetic-stripe image using a key identified by the key identification.

16. A merchant processing device for processing a secure transaction between a customer and a merchant, the merchant processing device comprising:
a radio-frequency antenna;
a keypad equipped for receipt of entry of alphanumerical strings;
a communications system;
secure-access memory; and
a processor in communication with the radio-frequency antenna, the keypad, and the communications system, the processor coupled with a computer-readable storage medium having a computer-readable program embodied therein for directing operation of the processor in accordance with the following:
receiving, with the radio-frequency antenna, a radio-frequency transmission packet from a customer portable device, wherein the radio-frequency transmission packet includes an encrypted magnetic-stripe image and an encrypted version of an alphanumerical identifier;
transmitting, with the radio-frequency antenna, an identification of the merchant processing device and a transaction identifier to the customer portable device, wherein the radio-frequency transmission packet received from the customer portable device further includes an encryption of the transaction identifier and the identification of the merchant processing device;
comparing, at the merchant processing device, the identification of the merchant processing device and transaction identifier received from the customer portable device with those transmitted to the customer portable device;
receiving a keyed nonencrypted version of the alphanumerical identifier with the keypad;
decrypting the encrypted version of the alphanumerical identifier with the processor;
comparing, with the processor, the decryption of the encrypted version of the alphanumerical identifier with the nonencrypted version of the alphanumerical identifier; and
thereafter, transmitting, with the communications system, a decryption of the encrypted magnetic-stripe image to a host system for processing the secure transaction using an account identified by the decryption of the magnetic-stripe image;
wherein comparing the decryption of the encrypted version of the alphanumerical identifier with the nonencrypted version of the alphanumerical identifier is performed offline by the merchant processing device before transaction approval is requested from the remote host system, and is performed without involvement of the host system.

17. The merchant processing device recited in claim 16 further comprising a barcode reader, wherein the computer-readable program further includes:
instructions for receiving a barcode scan of a barcode with the barcode reader; and instructions for transmitting, with the communications system, a barcode value corresponding to the barcode with the decryption of the encrypted magnetic-stripe image.

18. The merchant processing device recited in claim 16 wherein the computer-readable program further includes instructions for transmitting the alphanumerical identifier with the decryption of the encrypted magnetic-stripe image.

19. The merchant processing device recited in claim 16 further comprising an input device in communication with the processor, the computer-readable program further including instructions for receiving data from the input device.

20. The merchant processing device recited in claim 19 wherein the input device comprises a smart-card reader.

21. The merchant processing device recited in claim 16 further comprising an interface with a point-of-sale terminal equipped for processing the secure transaction with the magnetic-stripe image.

22. A system for processing secure transactions between customers and merchants, the system comprising:
- a host system;
- a plurality of merchant processing devices in communication with the host system, each of the merchant processing devices comprising:
  - a processing-device radio-frequency antenna;
  - a keypad equipped for receipt of entry of alphanumerical strings;
  - a communications system; and
  - a processing-device processor in communication with the processing-device radio-frequency antenna, the keypad, and the communications system; and
- a plurality of customer portable devices, each of the customer portable devices comprising:
  - a portable-device radio-frequency antenna;
  - a memory device;
  - an activation switch; and
  - a portable-device processor in communication with the portable-device radio-frequency antenna, the memory device, and the activation switch, wherein the merchant processing devices are configured to process the secure transactions by:
- exchanging electromagnetic transmission packets between the customer portable devices and the merchant processing devices, each such electromagnetic transmission packet including an encrypted magnetic-stripe image and an encrypted version of an alphanumerical identifier;
- decrypting the encrypted version of the alphanumerical identifier;
- comparing the decryption of the alphanumerical identifier with a purported alphanumerical identifier keyed with the keypad, and
- thereafter, exchanging a decryption of the encrypted magnetic-stripe image with the host system;

wherein during at least one transaction, comparing the decryption of the alphanumerical identifier with the purported alphanumerical identifier is performed offline by the merchant processing device before approval of a transaction is requested from the host system, and is performed without involvement of the host system;

wherein the processors are further configured to exchange an identification of a respective merchant processing device and a respective transaction identifier for each transaction between the respective merchant processing device and a respective customer portable device used to initiate the transaction;

and wherein the merchant processing devices are further configured to compare each identification of the respective merchant processing device and respective transaction identifier received from a respective customer portable device with those sent to the respective customer portable device.

23. The system recited in claim 22 wherein:
- at least some of the merchant processing devices further include a barcode reader; and
- the processors are further configured to receive a scan of a barcode and to exchange a barcode value corresponding to the barcode with the host system.

24. The system recited in claim 22 wherein the processors are further configured to exchange the alphanumerical identifier with the host system.

25. The system recited in claim 22 wherein at least the identification of the respective merchant processing device and respective transaction identifier are unencrypted during a first portion of the exchange and encrypted during a second portion of the exchange.

26. The method of claim 1, further comprising transmitting to the host system a flag that indicates that the alphanumerical identifier has been confirmed offline, the method performed without transmitting the alphanumerical identifier to the host system.

27. The system of claim 16, wherein the computer-readable program further directs operation of the processor in accordance with the following:
- without transmitting the alphanumerical identifier to the host system, transmitting to the host system a flag that indicates that the alphanumerical identifier has been confirmed offline.

28. The system of claim 22, wherein the exchanges of information between the merchant processing devices and the host system do not include the alphanumerical identifier, and wherein the merchant processing devices are configured to, during the processing of at least one of the secure transactions, transmit to the host system a flag that indicates that the alphanumerical identifier has been confirmed offline.

* * * * *

UNITED STATES PATENT AND TRADEMARK OFFICE
CERTIFICATE OF CORRECTION

| | | |
|---|---|---|
| PATENT NO. | : 7,831,519 B2 | Page 1 of 1 |
| APPLICATION NO. | : 10/997770 | |
| DATED | : November 9, 2010 | |
| INVENTOR(S) | : Kean | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 183 days.

Signed and Sealed this

Eleventh Day of October, 2011

David J. Kappos
*Director of the United States Patent and Trademark Office*